March 12, 1946.　　　G. H. THURSTON　　　2,396,623
BALL BEARING
Filed June 29, 1944　　　2 Sheets-Sheet 1

Inventor
GEORGE H. THURSTON,

By Clarence A. O'Brien
and Harvey B. Jacobson
Attorneys

March 12, 1946.  G. H. THURSTON  2,396,623
BALL BEARING
Filed June 29, 1944  2 Sheets-Sheet 2
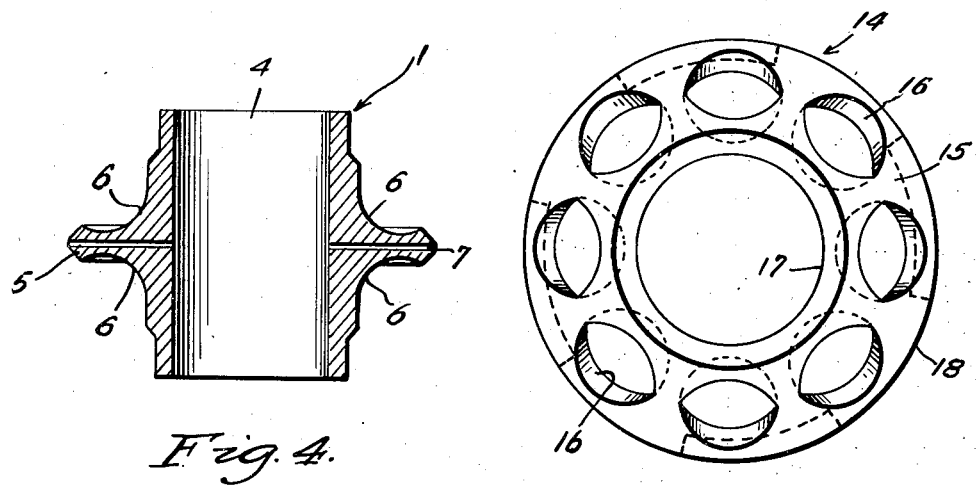
Fig. 4.
Fig. 5.
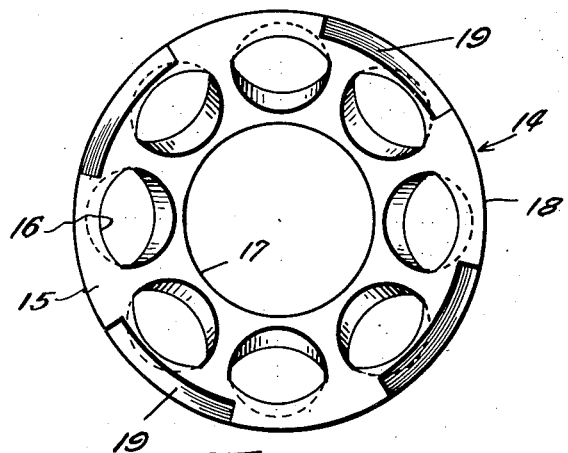
Fig. 6.
Inventor
GEORGE H. THURSTON,
By Clarence A. O'Brien
and Harvey B. Jacobson
Attorneys Patented Mar. 12, 1946

2,396,623

UNITED STATES PATENT OFFICE 2,396,623

BALL BEARING

George H. Thurston, Camp Hood, Tex.

Application June 29, 1944, Serial No. 542,672

1 Claim. (Cl. 308—189)

The present invention relates to new and useful improvements in ball bearings of the combined radial and thrust type and has for one of its important objects to provide, in a manner as hereinafter set forth, a bearing of this character which is adapted to be expeditiously assembled or disassembled for cleaning, repairing, or any other purpose.

Another very important object of the invention is to provide an anti-friction bearing of the aforementioned character which may be readily adjusted to compensate for wear.

Other objects of the invention are to provide an improved ball bearing of the character described which will be comparatively simple in construction, strong, durable, compact, and which may be produced at low cost.

The foregoing and other objects and advantages of the invention will become apparent from a study of the following specification, taken in connection with the accompanying drawings wherein like characters of reference designate corresponding parts throughout the several views, and wherein:

Figure 4 is a sectional view through the inner race.

Figure 5 is an elevational view of one of the ball cages or separators, looking at the outer side thereof.

Figure 6 is an elevational view of one of the ball cages or separators, looking at the inner side thereof.

Figures 1, 2:
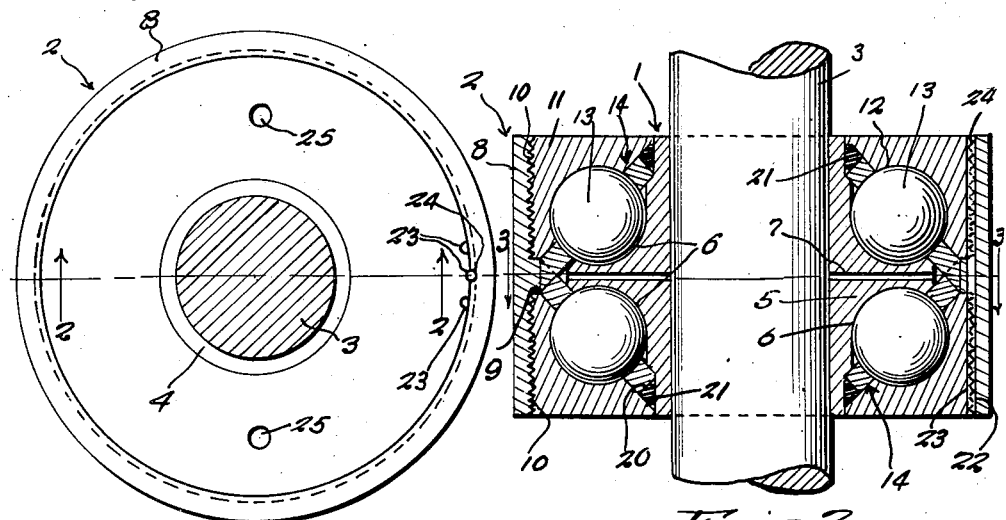
Figure 1 is an elevational view of a bearing constructed in accordance with the present invention, showing the shaft in section.
Figure 2 is a sectional view, taken substantially on the line 2—2 of Figure 1.
Figure 3:
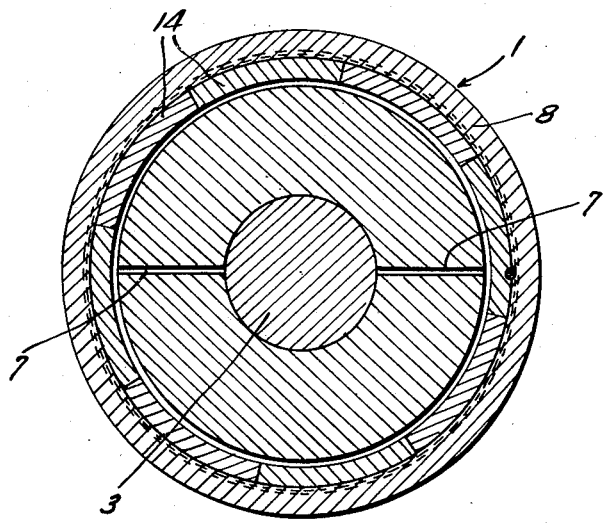
Figure 3 is a sectional view, taken substantially on the line 3—3 of Figure 2.

Referring now to the drawings in detail, it will be seen that the embodiment of the present invention which has been illustrated comprises inner and outer races which are designated generally by reference characters 1 and 2, respectively. The inner race 1 is mounted on a shaft 3.

As illustrated to advantage in Figure 4 of the drawings, the inner race 1 includes a cylindrical tube 4 of suitable metal. Formed integrally with the periphery of the tube 4 is a circumferential ridge 5 of substantially triangular transverse section having raceways 6 in its oppositely inclined faces. Lubricant ducts 7 extend from the apex of the ridge 5 to the inner periphery of the tube 4.

The outer race 2 comprises a metallic sleeve 8 having an internal rib 9 at an intermediate point. On opposite sides of the rib 9 the sleeve 8 is internally threaded, as at 10. Rings 11 of substantially triangular cross section are threadedly mounted in the sleeve 8. The oppositely inclined inner faces of the rings 11 have formed therein raceways 12.

The raceways 6 and 12 are opposed to each other for the reception of balls 13. The balls 13 are operable in cages or separators 14.

The ball separators 14 are in the form of substantially flat, frusto-conical rings 15 of suitable metal having spaced openings 16 therein which accommodate the balls 13. The inner and outer peripheral edges 17 and 18, respectively, of the rings 15 are beveled in parallel planes, as shown to advantage in Figure 2 of the drawings. Then, the beveled outer peripheral portions 18 of the rings 15 have formed therein circumferentially spaced, relatively staggered recesses 19 for the reception of the opposed portions of the other ring, whereby the separators 14 are interlocked against rotation relative to each other.

The beveled outer peripheries 18 of the rings 15 seat on the rib 9. The beveled inner peripheries 17 of the rings 15 seat on the tube 4 on opposite sides of the ridge 5. Also, the beveled inner portions of the rings 15 are recessed, as at 20, to accommodate lubricant retaining felts 21.

The sleeve 8 has formed longitudinally therein a groove 22. A plurality of complemental grooves 23 are provided in the outer peripheries of the rings 11 to be brought into registry with the groove 22. The opposed grooves 22 and 23 define an opening for the reception of a pin 24 for positively securing the rings 11 against rotation in the sleeve 8. The multiplicity of grooves 23 permit adjustment of the rings 11 in the sleeve 8.

It will thus be seen that a radial and thrust antifriction bearing of the ball type has been provided which may be readily assembled and disassembled. To take the bearing apart, it is only necessary to remove the locking pin 24 and unscrew the rings 11 from the sleeve 8, after which the separators 14 and the balls 13 may be readily removed. Openings or sockets 25 are provided in the rings 11 for the reception of a spanner wrench or other suitable tool to facilitate turning said rings. The raceways 6 and 12 provide large surface areas for contact with the balls 13, thereby insuring long life. The construction also is such as to prevent the escape of lubricating oil from the assembly.

It is believed that the many advantages of a ball bearing constructed in accordance with the present invention will be readily understood, and although a preferred embodiment of the device is as illustrated and described, it is to be understood that changes in the details of construction may be resorted to which will fall within the scope of the invention as claimed.

What is claimed is:

An anti-friction bearing of the character described comprising inner and outer races, the inner race including a cylindrical tube and a circumferential ridge of substantially right angled triangular transverse section on said tube, the right angle forming the apex of the triangle said ridge having raceways in its oppositely inclined faces, the outer race including a sleeve and rings of substantially right angled triangular transverse section threadedly mounted in said sleeve, said rings having raceways therein opposed to the first-named raceways and said inner and outer races when assembled forming a block of substantially rectangular cross section, balls operable in the opposed raceways, and substantially frusto-conical separators for the balls mounted between the opposed faces of the ridge and the rings, the outer peripheral portions of the separators having spaced, relatively staggered recesses therein for the reception of the opposed portions of the other separator for securing said separators against relative rotary movement, said separators when assembled forming a ring of V-shaped cross section seated between the sides of said triangular inner race and the bases of the opposed outer races.

GEORGE H. THURSTON.